UNITED STATES PATENT OFFICE.

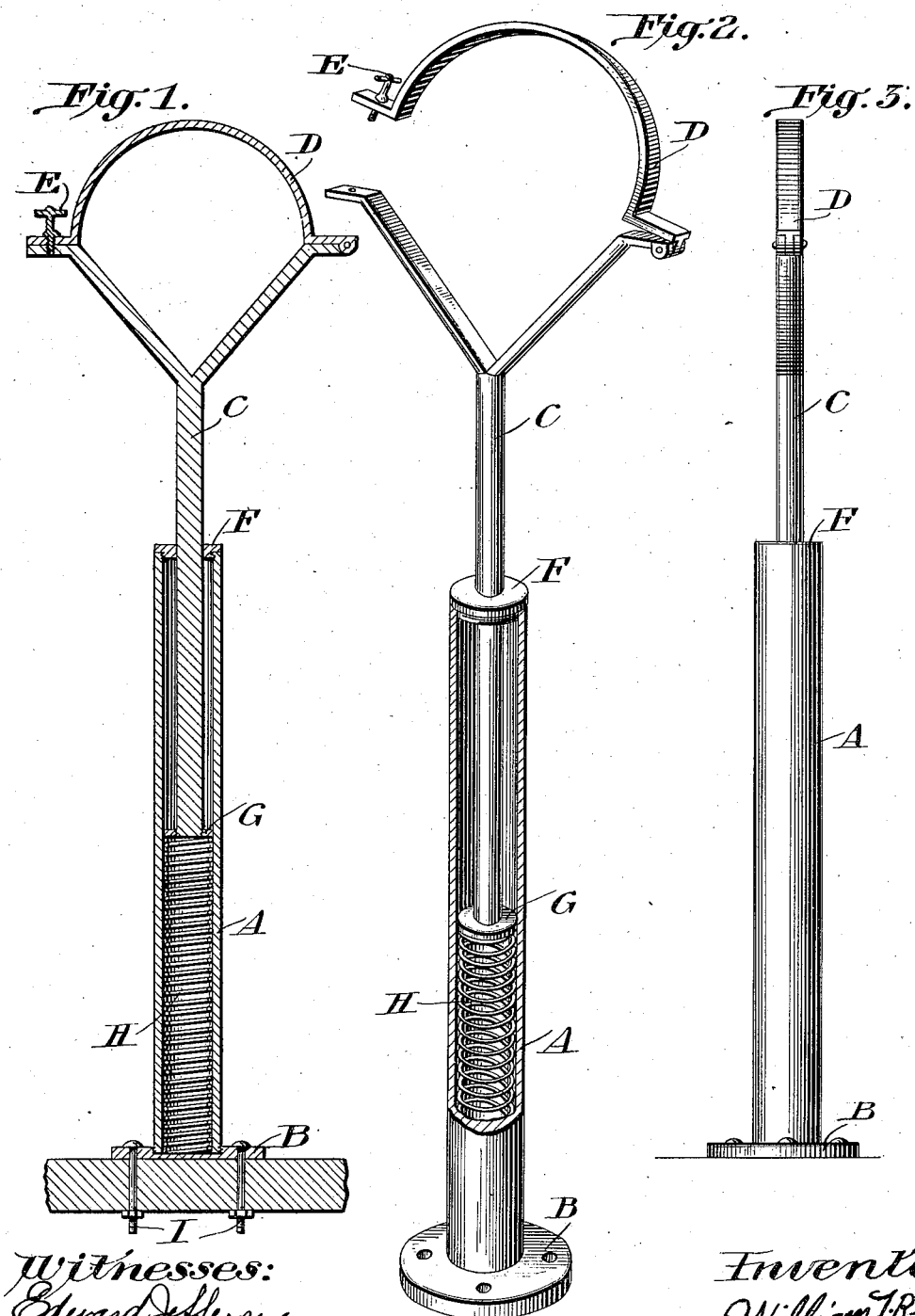

WILLIAM J. REEDER, OF LOUISVILLE, KENTUCKY.

TROLLEY-ADJUSTER.

1,028,785.  Specification of Letters Patent.  Patented June 4, 1912.

Application filed July 22, 1911. Serial No. 640,045.

*To all whom it may concern:*

Be it known that I, WILLIAM JOSEPH REEDER, a citizen of the United States, residing in Louisville, county of Jefferson, State of Kentucky, have invented a new and useful Trolley-Adjuster for Trolley-Poles, of which the following is a specification.

My invention relates to an improvement in a trolley adjuster for trolley poles; and the object of my invention is to devise a means whereby the trolley-pole will be prevented from flying up and striking the cross supporting wires when the wheel comes off the trolley wire, and also to make such a device simple and cheap in construction and easily attachable to the running board on top of a car under the trolley pole, and it consists essentially of a piston rod having a fork and hinged upper end to engage the trolley pole and having a flange at its lower end,—said spring being directly straight up and down and the strength of said spring being such as to equal the strength for holding the trolley pole against the wire.

The various parts of the device are constructed and arranged in detail as hereinafter more particularly and specifically described.

Figure (1) is a sectional view of my device, Fig. (2) is a half open sectional view and Fig. (3) complete view of my invention.

In the drawings like letters of reference indicate corresponding parts in each figure.

(A) is the center casing; (B) is the base which may be bolted to the top of the car, by any of the well known means; but in order to make my invention clear, I have shown one means of describing my adjuster; (F) is a screw cap that screws on top of (A); (C) is piston rod going through (F); (D) is a hinge fastened on top of (C), which holds trolley-pole in the fork; (E) is T-screw which secures pole in fork; (G) is the flange that screws on lower end of (C); (H) is spring that sets directly under (G); (I) are bolts and nuts which go through (B).

I am aware that prior to my invention other attachments for trolley poles have been made, therefore, I do not claim such a combination broadly as my claim, but

What I claim is,

A trolley pole adjuster, comprising a fork mounted in a casing secured to the top of a car, a cap for the top of said casing having a hole through its center, a piston rod on said fork projecting through said hole in the said cap, a flange on the lower end of said piston rod, a spring in said casing bearing up against the lower side of said flange, a retainer with one end hinged to the upper end of one of the forked arms and a thumb screw to secure the other end of the hinge to the other arm of said fork, substantially as herein described.

WILLIAM J. REEDER.

Witnesses:
CURTIS BOSWELL,
EDWARD JEFFERSON.

Copies of this patent may be obtained for five cents each, by addressing the "Commissioner of Patents, Washington, D. C."